June 18, 1968  H. E. BOOTH ET AL  3,388,591
METHOD OF GRADING TIMBER AND TIMBER PRODUCTS FOR STRENGTH AND
EQUIPMENT FOR USE IN ACCORDANCE WITH THE METHOD
Filed March 10, 1965  2 Sheets-Sheet 1

INVENTORS
HAROLD ERNEST BOOTH
ANTHONY ANTON

BY Parker + Vibber
ATTORNEYS

INVENTORS
HAROLD ERNEST BOOTH
ANTHONY ANTON
BY Parker + Wibber
ATTORNEYS

United States Patent Office 3,388,591
Patented June 18, 1968

3,388,591
METHOD OF GRADING TIMBER AND TIMBER PRODUCTS FOR STRENGTH AND EQUIPMENT FOR USE IN ACCORDANCE WITH THE METHOD
Harold Ernest Booth and Anthony Anton, both of 96 Harrington St., Sydney, New South Wales, Australia
Filed Mar. 10, 1965, Ser. No. 438,614
Claims priority, application Australia, Mar. 11, 1964, 41,919/64
3 Claims. (Cl. 73—100)

ABSTRACT OF THE DISCLOSURE

An apparatus and a method for grading lumber by subjecting sticks of timber to a lateral force sufficient to deflect the timber, repeating the application of such force at predetermined intervals spaced over the length of the stick, and marking the timber with a code denoting its strength as determined by the measurement of such deflections. The invention additionally includes means whereby curvature or inequalities in thickness of the timber are initially measured, such initial measurement and the subsequent deflection measurements being integrated whereby true deflection and accordingly true timber strength are recorded.

---

Figure 1:
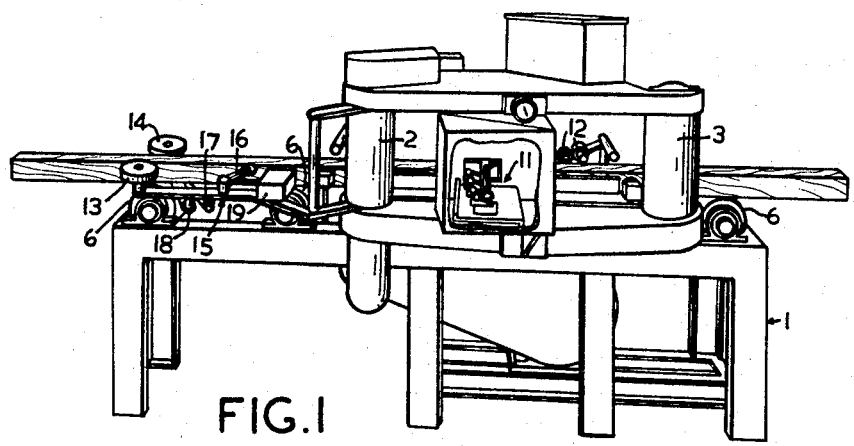

The grading of timber for strength has been achieved traditionally by visual inspection in conformity with systematic rules and relied upon an individual observing knots or other apparent flaws in a stick of timber and arbitrarily arriving at a figure for the timber strength.

Attempts have been made to achieve a mechanical grading of timber in which the timber was subjected to stress and grading achieved by a correlation between timber strength and stiffness in bending. However, known equipment has suffered disadvantages particularly having regard to high cost including employment of expensive machinery in the timber industry and also being defective in practical aspects including accuracy of results.

In certain known equipment the results achieved were inaccurate due to a combination of factors including the circumstance that the timber to be tested was subjected to vertical stresses in either direction while at the same time the overhang of a stick of timber introduced unwanted moment effects and vibration.

The primary object of the present invention is to provide a method utilising automatic mechanical means for determining the strength of timber and including associated means for marking timber in a colour code indicating the strength of sections thereof.

A further object of the invention is to provide a method of the kind indicated utilising arbitrary index figures indicating timber strength such figures being derived from destructive tests of timber from which absolute and reliable standards are achieved.

A further object of the invention is to provide equipment for carrying out the method of the invention of relatively low cost and hence available for use in the timber industry at large.

A further object of the invention is to provide a method and equipment applicable to the grading of any specified variety of timber coupled with the maintenance of derived accurate standards.

Other objects and advantages of the invention will be made apparent in the following description.

The method of grading timber and timber products for strength in accordance with the invention comprises subjecting sticks of timber side loaded and simply supported and applying thereto a force sufficient to achieve a deflection of the timber in either or both lateral directions and applying such tests at a predetermined order of frequency over the length of a stick of timber and marking said timber with a colour code denoting the strength as determined by measurement of the deflections.

The invention also contemplates the provision of equipment of left handed and right handed aspect which may be used in tandem whereby the timber is subjected to deflection in opposite senses thus taking care of weaknesses which might not be apparent in one direction of flexure.

The invention additionally includes in combination means whereby a stick of timber being curved or having inequalities in thickness due to rough milling, such as to falsify true deflection readings under stress is subjected to a preliminary measurement of its curvature and thereafter subjected to lateral stress and the preliminary measurements of curvature and the deflection measurements integrated whereby true deflection and accordingly timber strength is recorded.

The main method and equipment in accordance with the invention has proved effective for substantially straight sticks of timber and for example has given accurate and effective gradings in relation to timber having a curvature not exceeding one inch over twelve feet. In connection with indicated curved sticks of timber some errors have been eliminated by subjecting the timber to deflection in opposite senses. Nevertheless it has been observed that timber although curved or misshapen insufficiently to render lengths thereof unsuitable for many constructional purposes has been accorded a lower strength grading than deserved since the influence of its curvature or surface inequality was at least in part recorded as deflection thus falsely giving a low value of strength.

The invention accordingly includes a method of grading timber for strength comprising the steps of a preliminary measurement for curvature of a length of timber and thereafter subjecting the timber to lateral stress in a freely supported condition and recording deflection of the timber in either or both lateral directions and algebraically adding the curvature measurements and the deflection measurements to achieve the desired strength measurements.

The invention also includes an apparatus for carrying out the above method, the apparatus comprising means for retaining a stick of timber in a side loaded attitude and conveying it past a shape recording assembly comprising a wheel mounted on a spring loaded pivoted arm which is urged against the side of a piece of timber and moved in response to any departure of the timber surface from the plane in which it is aligned, movement of the wheel being measured and recorded at predetermined intervals of length and stored in an information bank; the timber is then passed side loaded and simply supported through stress measuring equipment and subjected to a lateral force causing its deflection in either or both lateral directions which deflection is also recorded in the information bank, the rate of travel of the timber through each section of the apparatus being synchronised and both stress and curvature measurements being recorded at the same predetermined intervals.

The invention is now more fully described with reference to the accompanying illustrative drawings.

Figure 2:
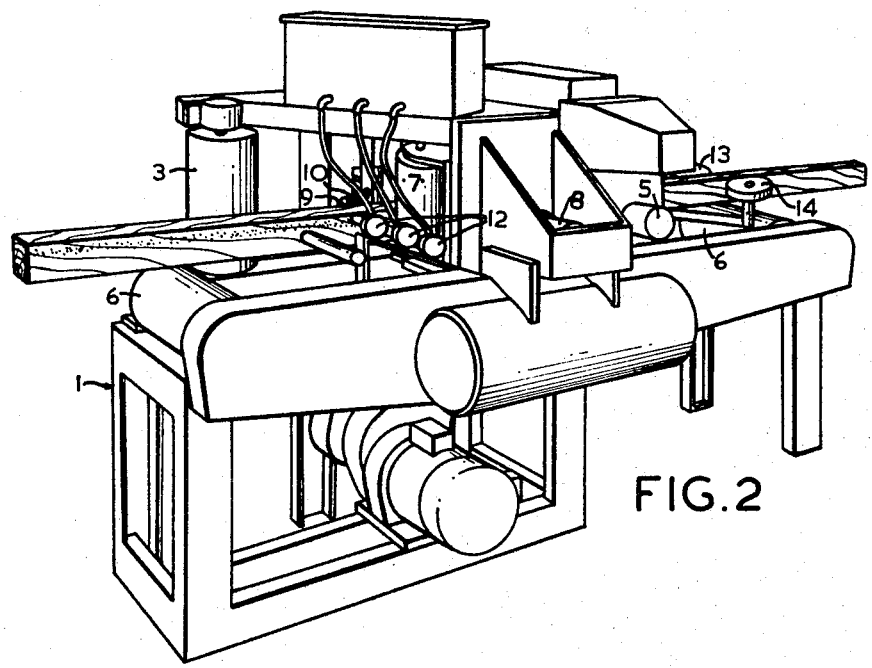
Figure 3:
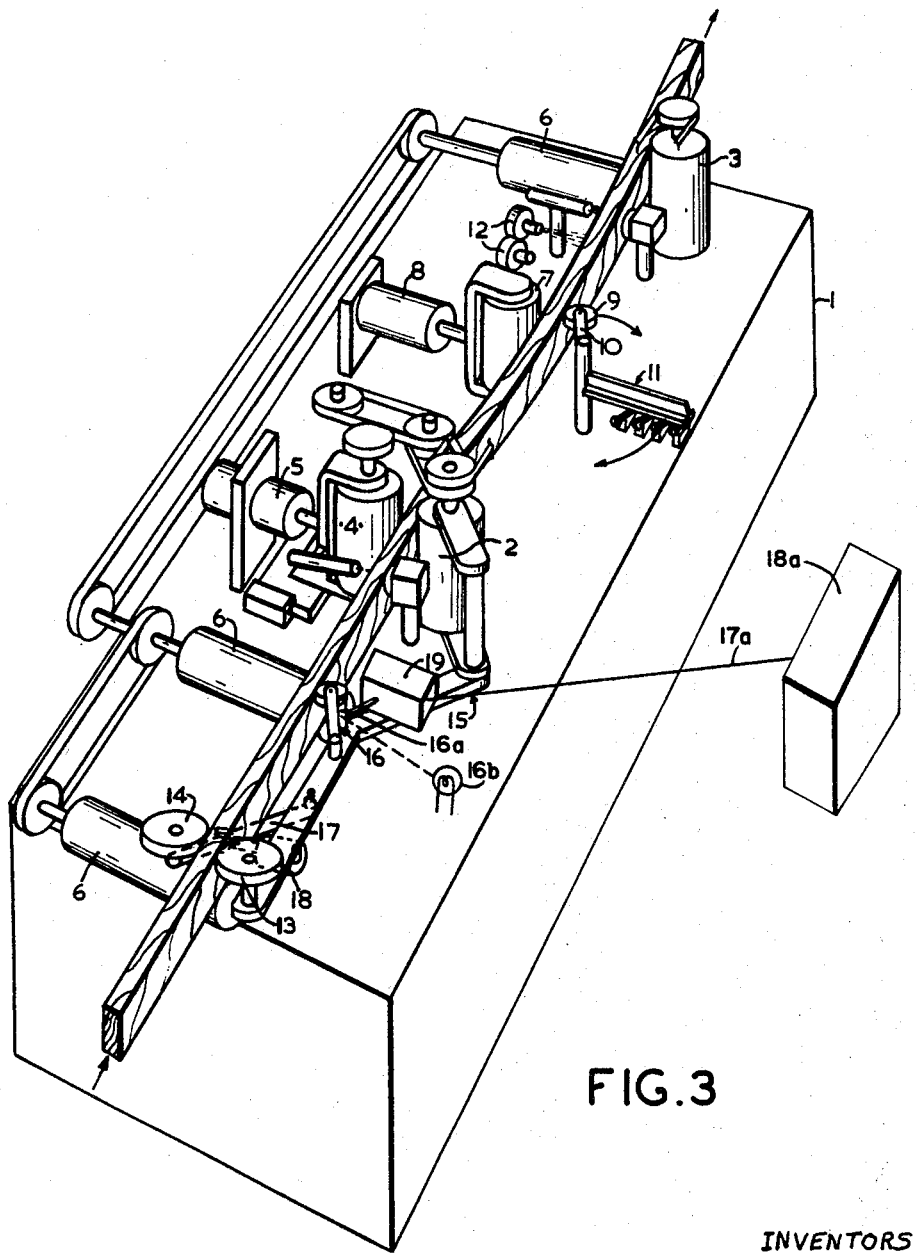

In the drawings:

FIGURE 1 is a partly diagrammatic front perspective front view of the assembled timber strength grading equipment; and FIGURE 2 is a rear quarter perspective view of the equipment shown in FIGURE 1; and FIGURE 3 is a general plan perspective view showing the operative relationship of the fundamental components of the equipment.

The fundamental equipment comprises a base frame 1 carrying upright rollers 2, 3 conveniently three feet apart rotating about a vertical axis. A leading roll assembly comprises the vertical fixed driven roll 2 and a second driven roll 4 having its axis coplanar with the first, said plane being at right angles to the line of feed of the timber. The second roll is air actuated by means of a piston assembly to grip the timber and propel it through the equipment. The roll 3 is a single idle roll. Horizontally disposed power driven supporting rollers 6 bear the weight of a stick of timber and convey it past the upright support rollers. Additional rollers between the illustrated rollers 6 have been omitted from the drawing.

Between the upright rollers there is disposed a loading roll 7 exerting a predetermined constant deflecting force against a stick of timber under the influence of a pneumatic cylinder assembly 8. The force applied is selected to suit the variety of timber undergoing test, and is such as to produce a sufficient deflection to provide a basis for the timber strength determination. The deflective force may be applied by pneumatic, hydraulic, or mechanical means.

A deflection measuring shoe, connected through a simple lever 10 operating a micro-switch system 11 is maintained in contact with a timber stick under test and its movement (indicated by the directional arrow), actuates said switching system operating solenoid controlled spray elements 12 which apply a coded coloured spray to the timber, permitting a direct reading of the timber strength. The spray elements may be of any convenient number corresponding to desired grade marking. Marking pens or marking rollers may be substituted as equivalents for the spray elements.

The preliminary curvature measuring stage of the equipment comprises the stand 1, common with the support of the stress grading equipment supporting further transverse parallel rollers 6 upon which a side loaded length of timber is supported and conveyed between the forward pair of vertical rollers 2 and 4 leading into the stress grading equipment which impinges against the sides of the timber and a rearward pair of rollers 13, 14 which impinge against the sides of the timber, the distance between the two pairs of rollers 13, 14 which impinge against the sides of the timber, the distance between the two pairs of rollers being 3 feet.

Pivotally connected to the axis of the forward pair of rollers 2, 4 is a shaped arm 15 which supports at about its mid-section a shaping wheel assembly 16 and also is provided with a lateral side arm 17 which pivotally supports the guide wheel or roller 14 opposite the fixed roller 14 located at the outer end of the shaped arm, the distance between these two rollers being adjustable to suit timber thickness and operate by means of an air cylinder system 18.

It is to be appreciated that the apparatus just described firmly retains a piece of timber and conveys it between the first (13, 14) and second (2, 4) pairs of rollers past the shaped recording wheel 16 without application of any appreciable stress to the timber.

The movements of the shaping wheel assembly 16 require to be recorded and correlated with the subsequently determined deflection measurements and a preferred electronic system for achieving this purpose is now described in general terms.

The movements of the shaping wheel 16 in response to the profile of a stick of timber are transferred to a tiltable mirror shown diagrammatically at 16 in FIG. 3 which focuses a beam from a light source 16 on to an assembly of photo-transducers diagrammatically shown by reference numeral 19, the movement of the mirrors being synchronised with the way of travel of the timber so as to complete its scan over 6 inches of timber travel.

The electrical impulses initiated by the light beam from the mirror are passed by a conduit 17a to banks of capacitors contained in a cabinet 18a and in the present embodiments seven banks connected with a rotary switch are employed whereby the six inch intervals are achieved by magnetic synchronisation of the switch on a circular path with the rate of timber travel. The cabinet 18a houses elements to be described, including relays, memory units, and a potentiometer which make up means for computing the bend of the board.

The banks of photo-transducers are so grouped that the highest deflection reading at any given switching point is that recorded adjacent photo elements being switched out preferentially to the highest reading.

Let it be assumed that a three feet section of timber has traversed the path between the first and second pairs of rollers and that the movements of the shaping wheel have been recorded by means of a photo electric system and accordingly recorded information is stored for future use. The timber is then subjected to stress in the stress grading section of the apparatus, previously described. The application of stress against the freely supported side loaded piece of timber is also made at intervals at 6 inches and the rate of travel is identical to that of the first stage.

By virtue of the fact that the selected measurement interval for curvature of timber stock is 6" and that the preferred embodiment of the machine loads the timber over a span of 36", both measurements of initial curvature and curvature induced in the second instance by application of a load are each made over 6" intervals, and by utilising an electronic memory having seven banks of twenty units each in a cyclic order the situation is achieved that when information is being read into a first bank a second bank is being read out and hence cleared so when 6" of stock travel later a curvature value can be read to the second bank while a third bank is being read out.

The initial curvature value is measured in digital units ranging from 0 (zero curvature) to + or − 10 units. By making the zero point say at −10 all curvature values may be measured digitally from 0 to 20 units.

The required information for stress grading of timber is the difference between the sum of curvatures i.e. initial curvature arising from the timber shape, and curvature due to deflection under load B and the initial curvature A. With the preferred equipment this data is obtained by means of a potentiometer. When connection is made with a point on the potentiometer corresponding in voltage to the value of B and to another point corresponding to the value of A then the voltage measured between these points gives the desired value. With this arrangement the digital output of the load zone transducer B is supplied to the potentiometer and as the deflection B varies, so point of connection of B to the potentiometer is correspondingly varied. The potentiometer connection for the initial curvature A from the memory bank occurs with each 6" of timber travel and at these intervals the voltage difference becomes apparent between A and B.

The voltage difference is applied to a set of discriminator circuits (four being sufficient in the present case).

Depending on the voltage value all discriminators set to fire at this voltage or less, fire and energise the grade relay to which each is connected. By sutiable interconnections the relay corresponding to the highest voltage group remains held on and the others release. Every 6" of stock travel this cycle is repeated and if the difference voltage is of higher group than the actual grade relay already held on then this latter relay switches off and a higher value relay is held on. In this way the voltage A–B is determined every 6" and the value obtained is compared with the highest previous value and the higher of the two is retained.

The timber stock which may be utilised with the present equipment may be of any length and when the end of a stick of timber is at the point of leaving the stress section of the apparatus it is marked on the grading achieved by operation of a dye spray solenoid system usually with a selected colour signifying the grade. Additionally, where a portion of a timber stick has some intermediate portion sufficiently weak to warrant rejection, the solenoid controlling the reject spray or marker operates and marks this weak timber portion. A stick of timber passed through the machine may accordingly carry a grade marking at its end and may be otherwise marked or unmarked over intermediate sections of its length. Sound timber sections will be clear of reject marks.

While the invention has been described with reference to an electronic logic system for achieving the desired measurement of grading stress values, it will be appreciated that both mechanical and/or a magnetic tape mechanical system may be employed for the same purposes.

The stress grading equipment is calibrated on the basis of data related to any given species or group of species of timber and derived from determinations of bending strength and stiffness tests using established laboratory methods and taking into account various levels of timber defects encountered in practice.

Analysis of the fundamental data achieved by statistical methods yields a correlation permitting evaluation of timber strength grades. In practice four grades of serviceable timber and a reject grade have been found satisfactory and give safe stress values at the 1% level of probability.

By virtue of the micro-switch actuated colour marking according to grade the equipment can handle timber stock at a rate of 100 feet per minute whether fed, closely butted or as discrete pieces.

A notable advantage of the method and equipment in accordance with the invention, as compared with previously known attempts to achieve mechanical grading, is that a timber stick is colour marked to show its grading over its length, whereby a faulty section may be cut away, leaving a desired high grade remainder. The known equipment merely achieved an average strength figure for a stick of timber.

Furthermore, grading achieved by the present method and equipment is not only rapid and accurate but allows of increased efficiency in the selection and best use of timber and employment of fixed standards. In this connection a test was made on a batch of Pinus radiata scantlings by visually grading them in compliance with SAA 376 to select timber having a safe stress of 1100 p.s.i. and of the batch only about 40% reached this grade.

The same batch graded in accordance with the present method was sorted into four approximately equal groups having stress values at the 1% level of probability of 2000, 1600, 1100, and 800 p.s.i. respectively and at the same time stress lowering defects were colour marked, permitting up-grading of the batch by docking Tests with numerous timbers have proved equally effective.

In the exemplified embodiment of the invention the power unit was an electric motor and as previously indicated the operation of the loading roller, deflection measuring shoe and colour sprays was by pneumatic means.

In order to ensure efficient employment of the method and equipment described and claimed provision may be made for denying access to means for setting operational characteristics determined for a given timber species thus precluding falsification of grading results.

We claim:

1. Apparatus for grading timber and timber products for strength comprising a base supporting a pair of upright spaced rollers, means for feeding a side loaded stick of timber past said rollers, consisting of a leading upright driven roller and a second laterally, movable upright roll adapted to press a side loaded stick of timber against said upright driven roll and propel it past the second of the pair of upright spaced rollers over horizontally disposed support rollers, a loading roll intermediate the pair of upright rollers and imposing a predetermined force against a side of the stick of timber as it travels, thus causing its deflection, means including a deflection measuring shoe connected to the intermediate roll for detecting the deflection of the stick at zones spaced at predetermined intervals along the length of the stick, a marking element applying a marking code to the surface of the stick of timber for denoting its grade, and means connected to and controlled by the deflection measuring shoe for actuating the marking element comprising means for recording the successive deflection measurements for each zone of the stick of timber, and means for actuating the marking element in accordance with the highest of such recorded deflection measurements.

2. Apparatus for grading timber and timber products according to strength comprising a base, means on the base for supporting a stick of timber in upright position and resting on one edge, means for conveying the thus supported stick of timber in the direction of its length, means on the base for preliminary measurement and recording of the curvature of a thus supported travelling stick of timber, succeeding means for subjecting the said side loaded stick of timber to lateral stress in a freely supported condition and for recording its deflection, said succeeding means including a spaced first, leading, and a second, trailing upright roller for restraining the stick of timber while it is subjected to lateral stress, the said means for preliminary measurement and recording of curvature of a side loaded freely supported stick of timber comprising a shape arm pivotably connected at its inner end to the axis of the leading upright roll of the said succeeding means, a fixed roller on the outer end of the shape arm, a pivotably mounted adjustable roller, means for urging the adjustable roller toward the said fixed roller thereby to hold a stick of timber in desired alignment, a shaping wheel assembly supported on the shape arm substantially midway of the length of the shape arm, means for maintaining the shaping wheel in contact with the opposed side of a stick of timber and for moving it in correspondence to the contour of the profile of the stick of timber, an electronic memory bank, means to transmit deflection measurements from said shape arm to the memory bank, and means for algebraically added deflection measurements recorded in said memory bank, said algebraically added measurements being those from the same stick of timber which are made in the successive progress of the timber stick through said curvature and stress deflection measurement means of the apparatus, both said curvature and stress deflection measurements being made over equal distances and at equal intervals of the travel of said timber stick.

3. Apparatus according to claim 2, wherein the means to transmit deflection measurements from the shape arm to the memory bank comprises a tiltable mirror connected to the shape arm, a light source, an assembly of phototransducers, and means connecting the output of the phototransducers to the electronic memory bank.

References Cited

UNITED STATES PATENTS

| | | | |
|---|---|---|---|
| 1,633,841 | 6/1927 | Andrew | 33—174 |
| 2,552,890 | 5/1951 | Eisler | 33—206.5 X |
| 3,056,209 | 10/1962 | Oliver | 73—105 X |
| 3,143,878 | 9/1964 | Hoyle et al. | 73—100 |
| 3,158,021 | 11/1964 | Walters et al. | 73—100 |
| 3,196,672 | 7/1965 | Keller | 73—100 |
| 3,194,063 | 7/1965 | McKean | 73—100 |

OTHER REFERENCES

The Australian Timber Journal, March 1964, pp. 73-84, 73-100.

RICHARD C. QUEISSER, *Primary Examiner.*

J. H. WILLIAMSON, *Assistant Examiner.*